(12) United States Patent
Ördögh (10) Patent No.: US 9,215,200 B2
(45) Date of Patent: Dec. 15, 2015

(54) IDENTIFYING SPECIAL OBJECTS IN A STORAGE FOLDER IN CONVERGED INTERNET PROTOCOL MESSAGING

(71) Applicant: Research In Motion Limited, Waterloo (CA)

(72) Inventor: Zoltán Ördögh, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 288 days.

(21) Appl. No.: 13/715,742

(22) Filed: Dec. 14, 2012

(65) Prior Publication Data

US 2014/0172993 A1 Jun. 19, 2014

(51) Int. Cl.
*G06F 15/16* (2006.01)
*H04L 12/58* (2006.01)

(52) U.S. Cl.
CPC .............. *H04L 51/22* (2013.01); *H04L 51/36* (2013.01)

(58) Field of Classification Search
CPC ... H04L 29/08711; H04L 51/22; H04L 51/36; H04L 67/2804
See application file for complete search history.

(56) References Cited

U.S. PATENT DOCUMENTS

| 7,164,904 | B2 * | 1/2007 | Nagy et al. | 455/403 |
|---|---|---|---|---|
| 2007/0266144 | A1 * | 11/2007 | Bollen et al. | 709/224 |
| 2010/0325224 | A1 * | 12/2010 | Pattan et al. | 709/206 |
| 2012/0124147 | A1 * | 5/2012 | Hamlin et al. | 709/206 |
| 2013/0097265 | A1 * | 4/2013 | Lee et al. | 709/206 |
| 2014/0172993 | A1 * | 6/2014 | Ordogh | 709/206 |
| 2015/0032828 | A1 * | 1/2015 | Ordogh | 709/206 |

OTHER PUBLICATIONS

Doc# OMA-COM-CPM-2012-0053R02-CR_CPM_Session_History_Storage_MS.doc Change Request (Request) pp. 1-15. Oct. 24, 2012.*
Daboo, C.; "The IMAP METADATA Extension"; RFC 5464; Feb. 2009; 21 pages.*
Daboo, C., et al.; "Internet Message Access Protocol—ANNOTATE Extension"; RFC 5257; Jun. 2008; 31 pages.*
Open Mobile Alliance; "Converged IP Messaging Architecture"; Draft Version 2.0; OMA-AD-CPM-V2_0-20120926-D; Sep. 26, 2012; 55 pages.
Open Mobile Alliance; "CPM Message Storage"; Draft Version 2.0; OMA-TS-CPM_MessageStorage-V2_0-20121122-D; Nov. 22, 2012; 38 pages.
Open Mobile Alliance; "OMA Converged IP Messaging System Description"; Draft Version 2.0; OMA-TS-CPM_System_Descripton-V2_0-20121122-D; Nov. 22, 2012; 120 pages.
Open Mobile Alliance; "CPM Session History Storage MS"; OMA-COM-CPM-2012-0053R01-CR_CPM_Session_History_Storage_MS.dox; Oct. 24, 2012; 8 pages.

(Continued)

*Primary Examiner* — Lance L Barry
(74) *Attorney, Agent, or Firm* — Conley Rose, P.C.; J. Robert Brown, Jr.

(57) ABSTRACT

A method is described for providing access to an open mobile alliance (OMA) object, the method may be performed by an email network device, wherein the OMA object is in a mailbox, the method comprising: storing a reference as a metadata entry associated with the mailbox, wherein the mailbox contains the object and the reference identifies the object.

25 Claims, 5 Drawing Sheets

(56) References Cited

OTHER PUBLICATIONS

Open Mobile Alliance; "CPM Session History Storage MS"; OMA-COM-CPM-2012-0053R02-CR_CPM_Session_History_Storage_MS.doc; Oct. 24, 2012; 15 pages.
Freed, N., et al.; "Multipurpose Internet Mail Extensions, (MIMIE) Part One: Format of Internet Message Bodies"; RFC 2045; Nov. 1996; 29 pages.
Crispin, M.; "Intenet Message Access Protocol—Version 4rev1"; RFC 3501; Mar. 2003; 108 pages.
Resnick, P., et al.; "Internet Message Format"; RFC 5322; Oct. 2008; 57 pages.
Berners-Lee, T., et al.; "Uniform Resource Identifier (URI): Generic Syntax"; RFC 3986; Jan. 2005; 57 pages.
Berners-Lee, T., et al.; "Uniform Resource Identifiers (URI): Generic Syntax"; RFC 2396; Aug. 1998; 38 pages.
Arkko, J., et al.; "IANA Allocation Guidelines for the Address Resolution Protocol (ARP)"; RFC 5494; Apr. 2009; 7 pages.

\* cited by examiner

IDENTIFYING SPECIAL OBJECTS IN A STORAGE FOLDER IN CONVERGED INTERNET PROTOCOL MESSAGING

FIELD OF THE DISCLOSURE

The present disclosure relates to converged internet protocol messaging (CPM).

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node or an access point. As used herein, the term access may also include the process by which a user is able to read or write data at an interface.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Converged internet protocol (IP) messaging (CPM) is an enabler used to converge many different forms of messaging on a single service. For example, the CPM enabler converges short message service (SMS), multimedia messaging service (MMS), email, instant messaging (IM), push to talk over cellular (PoC), and various CPM based services. As used herein the term enabler may include a technology intended for use in the development, deployment or operation of a service. The enabler may be defined in a specification, or group of specification or published as a package by the Open Mobile Alliance (OMA). As used herein, the term OMA component may include a replaceable or reusable unit that is responsible for a particular set of functionality and associated information. An OMA component may form all or part of an enabler.

The CPM enabler may interact with a user mailbox that may comprise a default system folder. A default system folder may be a special mailbox containing CPM-specific information. The term "default system folder" may be a logical reference used to pinpoint a specific mailbox in a storage hierarchy. The "default system folder" may serve as an entry point, i.e. as a root folder, for all CPM related storage objects that are managed by a system, e.g. the CPM participating function. As described above, the default system folder may be the root folder for all CPM Message Store folders and objects. The initial location of the default system folder may be determined by a service provider. While the default system folder may be located along a different folder path for each user, there may be only one such folder per CPM User. The default system folder may contain Conversation History Folders. The 'DefaultFolderLocation' server annotation as described herein may be used, and its value may refer to the location of the default system folder. The CPM Message Storage Client and the CPM Participating Function (i.e. all CPM functional components that are accessing the CPM Message Storage Server one way or another) may determine the location of the default system folder by retrieving the 'DefaultFolderLocation' server annotation.

The default system folder may contain one or more conversation history objects. Each conversation history object may contain a session history folder unique to a particular conversation history object. Each session history folder may contain a session info object specific to the session history folder it resides in. The location of the session info object may not be readily ascertainable when accessing the session history folder. The location of the session info object may be stored in metadata of the session history folder. Metadata may be defined as information that characterized data. As used herein, the term folder may contain a local or remote container, holding together items that belong together for the sake of organizing items. As used herein, the term object may refer to an OMA object, the OMA object may be data formatted according to some specific purpose in an OMA enabler. The metadata may be stored by either a user or a system associated with the folder. The metadata may be stored in accordance with the metadata IMAP4 extension as defined in IETF RFC5464, RFC5257, and RFC3501. The metadata model used herein may comprise two parts, metadata flags and metadata annotations. Metadata flags, i.e. IMAP system flags and keywords, may be associated with message objects, file transfer history objects, session history objects, and/or standalone Media Objects. Metadata flags may indicate additional state information about a stored object. Metadata annotations may be associated with folder objects (i.e. mailboxes) and message objects (i.e. messages) stored in a Message Storage Server. Metadata annotations may provide system- or user-defined information that the system or the user associates with stored objects. As used herein, the term metadata may comprise metadata flags and/or metadata annotations.

Figure 1:
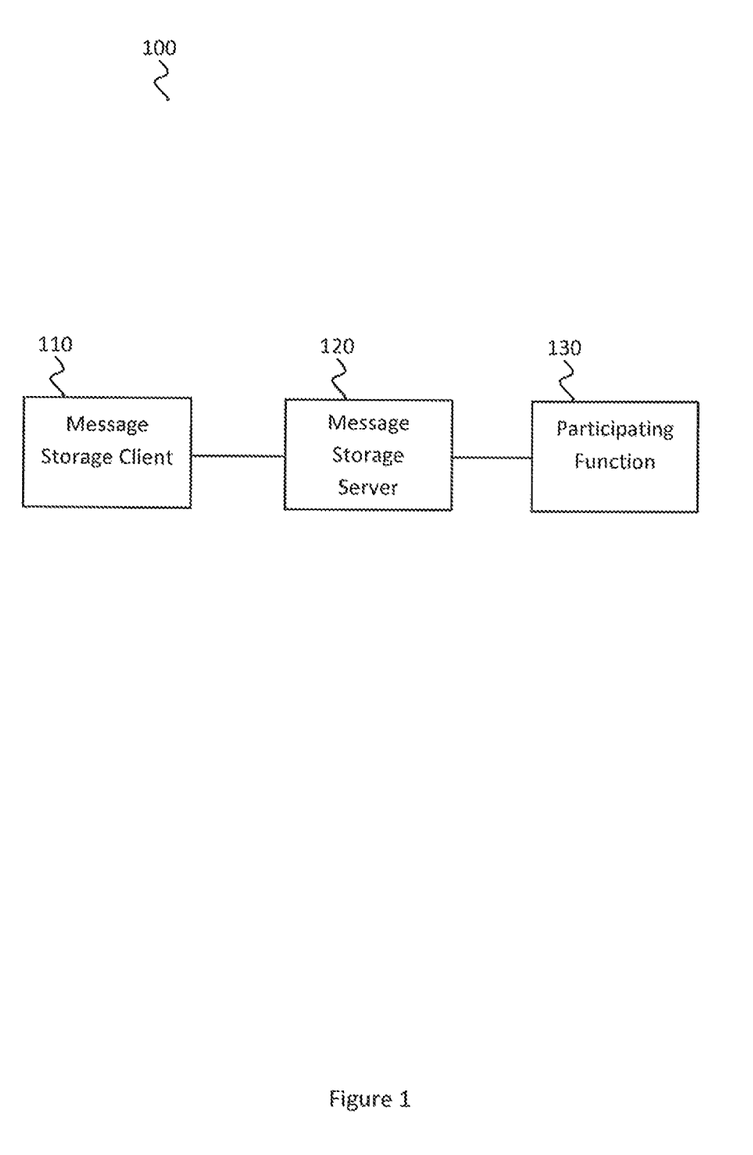
FIG. 1 is a diagram of a portion of a CPM environment.

FIG. 1 illustrates a portion of a CPM environment 100. The portion of the CPM environment 100 comprises a message storage client 110, a message storage server 120, and a participating function (PF) 130. The message storage client may reside on a user equipment (UE). The message storage client 110 may support the metadata IMAP4 extensions as defined in IETF RFC5464. The message storage server 120 and the participating function 130 may each reside on separate pieces of network equipment or the same piece of network equipment. The message storage server 120 may be an internet message access protocol (IMAP) server. The message storage server 120 may support folder metadata annotations and message metadata annotation as defined for IMAP4 mailboxes and message objects.

When a message storage client needs to update metadata of a message object, the message storage client may send a STORE request as defined in IETF RFC3501 including the unique identifier (UID) of the message object and the changes to the flags (e.g., \Seen, \Deleted, etc.). The message storage server 120 may receive the STORE request specifying message metadata updates and the message storage server 120 may handle metadata annotations specified in the STORE request according to the ANNOTATE IMAP4 extension defined in IETF RFC5257. When a Message Storage Client needs to update server or folder metadata annotations, the Message Storage Client may send to the Message Storage Server a SETMETADATA request as defined in RFC5464 including: the name of the folder whose metadata is to be updated, and an entry specifier and value pair (i.e. the entry specifier and the value corresponding to the entry specifier). The name of the folder may be an empty string (i.e. " ") to update server annotations. The SETMETADATA request may allow a requestor to include multiple updates in a request. In certain embodiments, in order to reduce network overhead and delays, a requestor may update all annotations at once by including all entry specifier and value pairs in a single request.

When a Message Storage Client needs to retrieve the metadata flags of a message object, the Message Storage Client may send to the Message Storage Server a FETCH request as defined in IETF RFC3501 including the UID of the message object and the 'FLAGS' data item name. When a Message Storage Client needs to retrieve the metadata flags of a message object, the Message Storage Client may send to the Message Storage Server a FETCH request as defined in IETF RFC3501 including the UID of the message object and the 'ANNOTATION' data item name, as defined in IEFT RFC5257. When a Message Storage Client needs to retrieve server or folder metadata annotations, the Message Storage Client may send to the Message Storage Server a GETMETADATA request as defined in IETF RFC5464 including: the name or the folder whose metadata is requested, and the entry specifier. The name of the folder may be an empty string (i.e. " ") to retrieve server annotations.

Upon receiving a FETCH request with the UID addressing one or more stored objects of the Message Storage Server, the Message Storage Server may return the metadata flags according to the FETCH command as defined in IETF RFC3501. If the FETCH request includes the 'ANNOTATION' data item name and the Message Storage Server supports fetching message metadata annotations (i.e. indicates support for the ANNOTATE IMAP4 extension defined in IETF RFC5257), the Message Storage Server may return any message metadata annotations according to the ANNOTATE IMAP4 extension defined in IETF RFC5257.

Upon receiving a GETMETADATA request with the name of a folder stored on the Message Storage Server—or the empty string (i.e. " ") in case of server annotations —, the Message Storage Server SHALL return the appropriate metadata annotations according to the GETMETADATA command as defined in RFC5464.

The participating function 130 may be primarily responsible for creating mailboxes and storing messages on the message storage server 120. The participating function 130 may be a CPM participating function (CPM PF). The CPM PF may be a user-specific functional component. The CPM PF's functionalities may be performed in a CPM User's home network and may be invoked when the CPM User initiates an originating request or receives a terminating request. As used herein, the term CPM User's home network may be a network provided by the CPM User's own service provider that may include a CPM environment trusted by the user. The CPM PF may handle CPM Sessions, CPM File Transfers, CPM Standalone Messages, and/or Media on behalf of the Participant that the CPM PF serves and may enforce CPM User Preferences and service provider policies. Additionally, The CPM PF may perform deferring functionality by storing CPM Messages and CPM File Transfer file(s) temporarily and deferring CPM Messages and CPM File Transfer file(s) for later delivery depending on user preferences, availability and willingness of the CPM User. The CPM PF may also provide conversation history functionality by recording a Participant's CPM Conversations and storing these recorded CPM Conversations into the message storage server 120.

The messages storage client 110 may be primarily responsible for retrieving mailboxes and messages from the message storage server 120. The messages stored in the message storage server may be configured to comply with Internet Engineering Task Force (IETF) request for comments (RFC) 5322. Objects in the CPM environment 100 may be stored as messages in the message storage server 120. For example, if the message storage server 120 is IMAP based, all objects must be stored as message folders and messages. Further in an IMAP based embodiment, the PF and all other clients may be seen as clients of the IMAP server. IMAP servers and IMAP clients may be focused strictly on messages and mailboxes, thus from the IMAP perspective the CPM enabler's functions appear as mailboxes and messages.

Figure 2:
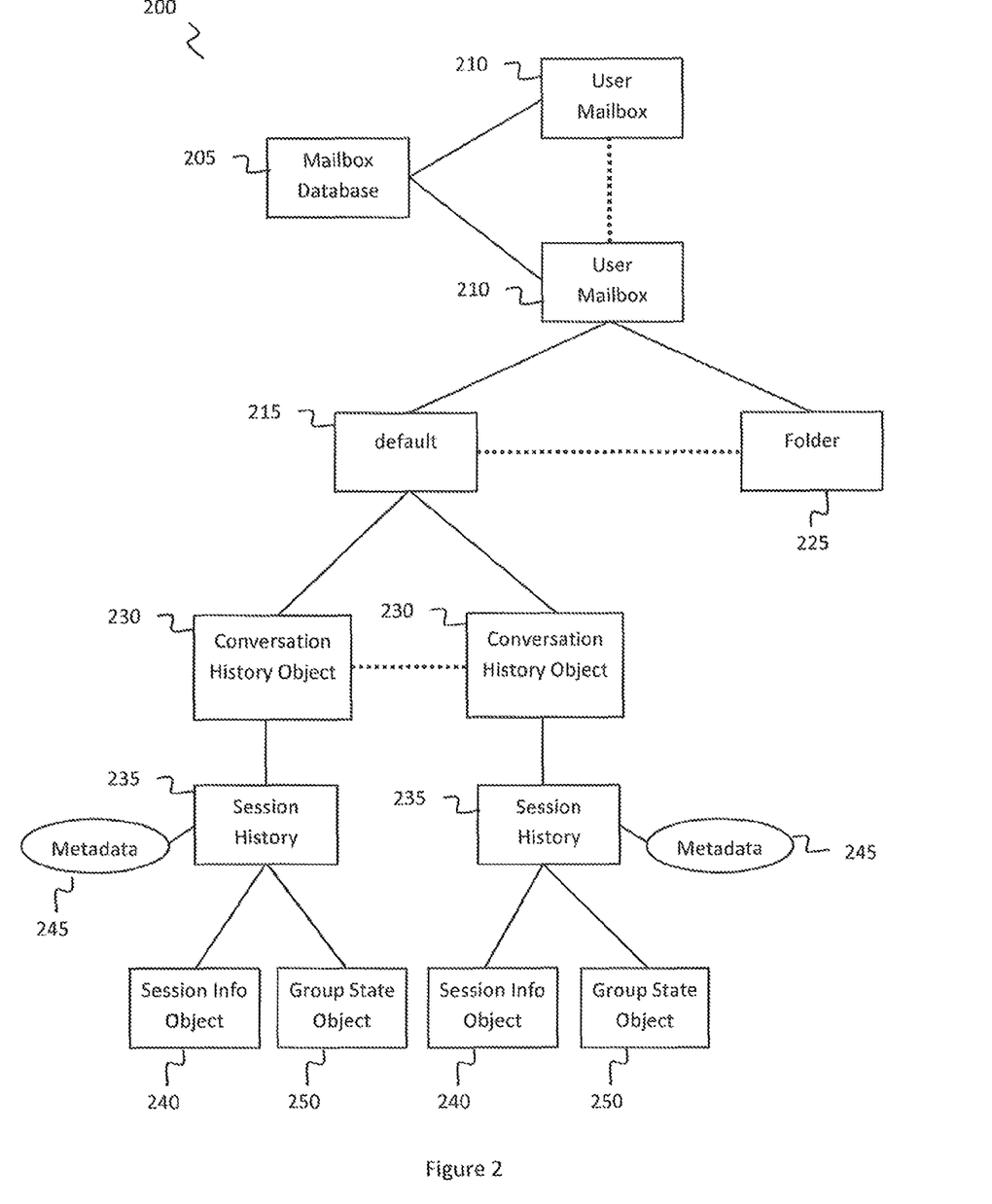
FIG. 2 is a diagram of a CPM message storage layout.

FIG. 2 is a diagram of a CPM message storage layout 200. The CPM message storage layout 200 may be stored on a message storage server 120. The CPM message storage layout 200 may comprise a mailbox database 205. The mailbox database 205 may comprise one or more user mailboxes 210. Each user mailbox 210 may comprise one or more folders 225. The user mailbox may comprise a default system folder 215 and other folders 225. In some embodiments, the default system folder 215 may have a name other than 'default' and it may be located under any other folder(s) in a user's mailbox, but the components of the default system folder 215 are generally the same from one CPM implementation to another regardless of the name or location of the default system folder 215.

The default system folder 215 may comprise one or more conversation history objects 230. The conversation history object 230 is configured to store all relevant information about a particular conversation. In an IMAP server embodiment, the conversation history object 230 appears as a folder to the IMAP server. Each conversation history object 230 may comprise a session history folder 235, and each session history folder 235 may contain a session info object 240 and a group state object 250. The session history folder 235 may contain information relevant to a particular chat that occurred during a conversation stored in the conversation history object 230. In addition to the session info object 240, the session history folder 235 may contain a group state object 250, any number of message objects, file transfer history objects, and standalone media objects. The session info object 240 is used to store information related to the session stored in the session history folder 235. In some embodiments, where the mailbox database 205 is stored in an IMAP server, the session info object 240 may be saved as a message, along with any other messages or data stored in the session history folder 235. The session history folder 235 may have metadata 245 associated with it. The metadata 245 may contain information related to the session history folder 235. In some embodiments, information related to the session info object 240 may be stored in the metadata 245 to improve efficiency in locating the session info object 240 in the session history folder 235. For example, the metadata entry referring to the session info object 240 may be stored in metadata 245. The session info object 240 may be identified using any identifying information that is unique within the session history folder 235. For example, the session info object 240 may be identified using a UID, a sequence number, or even an IMAP uniform resource locator (URL).

In certain embodiments, special objects, such as the session info object 240 and the group state object 250 may be easily located in the session history folder, i.e. without having to search through all items in the session history folder, by using their corresponding metadata entries. The session info object 240 may be stored in the session history folder 235. A CPM PF may retrieve the UID of the session info object 240 and store the UID in metadata associated with the session history folder 235. The CPM PF may also retrieve the UID of the group state object 250 and store the UID of the group state object 250 in metadata associated with the session history folder 235. When the UIDs are stored in metadata, the objects associated with the UIDs may be quickly accessed without searching the entire folder. For example, the UID of the session info object may be set to '3000', and the UID of the group state object may be set to '4000'. The following metadata entries may be made to quickly locate the associated object: SessionInfoObjectID, GroupStateObjectID, and DefaultFolderLocation, which correspond to the session info object, group state object, and the location of the default system folder respectively. The CPM PF may update the metadata annotations for the session history folder using the following entries: "/shared/OMNA/OMACPM20/SessionInfoObjectID" and "/shared/OMNA/OMACPM20/GroupStateObjectID".

As used herein, the term resource may include any component, function, enabler, or application that can send, receive, or process requests. In certain embodiments, the term UID may be in compliance with IETF RFC3501, where each UID may be a 32 bit value related to a particular message object which may be combined with a 32 bit unique identifier validity value resulting in a 64 bit value that is unique to the particular message within the mailbox. It should be noted that UIDs are unique only within a particular mailbox and not across mailboxes. In certain embodiments, the term uniform resource identifier (URI) may be in compliance with IETF RFC3986, where a URI may be a compact sequence of character that identifies an abstract or physical resource. In certain embodiments, the term URL may be in compliance with IETF RFC2396, wherein the term URL may refer to the subset of URI that identifies resources via a representation of their primary access mechanism, e.g., their network location, rather than identifying the resource by name or some other attribute.

In some embodiments, a reference to the session info object may be stored in metadata using the IMAP metadata extension defined in IEFT RFC5494. As used herein, the term reference may include a name which has a one to one correspondence with a file or folder. For example, a SETMETADATA command may be issued by a client in order to create the entry used to reference the session info object. A SET command may be used as a command to store information. Later when the session info object is needed, a client may issue a GETMETADATA command to retrieve the previously stored metadata. A GET command may be used to retrieve information. In the previous example, the client that stores the metadata may be the PF, and the client that retrieves the metadata may be an IMAP client within an end user's device. As used herein, the term command may include a reserved word or string which is sent from a first communicating entity to a second entity which elicits a response from a specific activity in the second entity. As used herein, the term argument may include parameter which are passed along with a command or instruction which determine the behavior of the command or instruction. As used herein, the term parameter may include a string of character or a numerical value, for example, a name or argument. As used herein, the term pair may include two arguments passed with a command or instruction.

The following is an example of storing metadata according to the embodiment described above. In this example, the session info object is referenced using a sequence number. In some embodiments, the sequence number may be a message sequence number as defined by IETF RFC3501. As each new message object is added, it is assigned a message sequence number that is 1 higher than the number of messages in the mailbox before that new message was added. Also in this example, the client is the PF, the "C:" denotes a command issued by an IMAP client, and the "S:" denotes a response from an IMAP server:

```
C: 1 SETMETADATA NewSession(/shared/SessionInfoObjectID "SEQ:1")
S: 1 OK SETMETADATA complete
```

Retrieving metadata (client is an IMAP client within an end-user's device):

```
C: 1 GETMETADATA "NewSession" /shared/SessionInfoObjectID
S: * METADATA "NewSession" (/shared/SessionInfoObjectID "SEQ:1")
S: 1 OK GETMETADATA complete
```

In some embodiments, the metadata may be entered into the shared tree of the metadata. For example the entry may be stored as "/shared/SessionInfoObjectID". In some instances top-level entries into the shared tree may be undesirable. Conflicts may arise with other entries in the top level of the shared tree. In some other embodiments, a tokenized string may be inserted into the hierarchy structure of the shared tree. For example, the entry may be stored as "/shared/OMACPM20/SessionInfoObjectID". The tokenized string in this example is "OMACPM20". The tokenized string may be selected to correspond to a particular enabler token and the enabler revision. In this case the enabler token is "OMACPM" and the enabler revision is "20" to reflect revision 2.0 of the OMA CPM enabler. In this case, the token may be reused with other enablers or different versions of the same enabler if required, and reduce the possibility of conflicts. In the case where the tokenized string is used a single query may return all metadata related to that tokenized string using a DEPTH infinity command with a GETMETADATA command. As used herein the term token may include a sequence of characters.

The following is an example of storing metadata according to the embodiment described above. In this example, the session info object is references using a sequence number. Also in this example, the client is the PF, the "C:" denotes a command issued by an IMAP client, and the "S:" denotes a response from an IMAP server:

```
C: 1 GETMETADATA "NewSession" (DEPTH infinity) /shared/
OMACPM20
S: * METADATA "NewSession" (/shared/OMACPM20/
SessionInfoObjectID "SEQ:1" /shared/OMACPM20/
SomeOtherCPMSetting "val")
S: 1 OK GETMETADATA complete
```

In still further embodiments, an entire hierarchy or namespace may be reserved for a standards development organization, or some other organization using the metadata tree. A namespace may refer to a container for a set of identifiers. The namespace may provide for avoiding naming conflicts. For example, OMNA, the naming authority of the OMA standards development organization, may reserve an entire sub-tree, i.e. namespace. The OMNA sub-tree may be a top-level tree, or it may fall under the private or shared trees. For example the following could be possible sub-trees for use by OMNA "/shared/OMNA", "/private/OMNA", "/OMNA". While OMNA (Open Mobile Naming Authority) is used as a sample name, the OMA standards development organization may select any name to register. While the example involves the OMA working group, other standards development organizations may also reserve a sub-tree, i.e. 3GPP, 3GPP2, ETSI, ITU, and W3C. Using this example, each standards group may define their own metadata entries and control them through their own registration schemes. In the case where the sub-tree is reserved, the metadata entry may look like "/shared/OMNA/OMACPM20/SessionInfoObjectID". Once again, all metadata related to the OMA standards development organization may be retrieved using a DEPTH infinity GETMETADATA command.

The following is an example of storing metadata according to the embodiment described above. In this example, the session info object is referenced using a sequence number. Also in this example, the client is the PF, the "C:" denotes a command issued by an IMAP client, and the "S:" denotes a response from an IMAP server:

```
C: 1 GETMETADATA "NewSession" (DEPTH infinity) /shared/OMNA
S: * METADATA "NewSession" (/shared/OMNA/OMACPM20/
SessionInfoObjectID "SEQ:1"      /shared/OMNA/OMACPM20/
SomeOtherCPMSetting       "val"
/shared/OMNA/SomeEnabler/EnablerTree/Thingie "key:success")
S: 1 OK GETMETADATA complete
```

In some embodiments, server annotation may be used in order to enable identification of specialized folders. For example, the default system folder previously described herein may be identified using a server annotation entry that reads "/shared/OMNA/OMACPM20/DefaultFolderLocation". The value of the entry would contain the full path to the default system folder. In another example, the metadata entry for the default system folder may contain a fully qualified mailbox name suffixed with a server's hierarchy separator character, i.e. a parameter to be used by a SELECT command, in this case the entry may read: "/INBOX/CPM2/-=default=-". Using this technique, the location of the default system folder may be easily updated by updating the metadata entry. This technique may also be used for any other special folder or object.

The following is an example of identifying special folders according to the embodiment described above. In this example, the client is the PF, the "C:" denotes a command issued by an IMAP client, and the "S:" denotes a response from an IMAP server:

```
C: 1 GETMETADATA "" /shared/OMNA/OMACPM20/
DefaultFolderLocation
S:  *  METADATA  ""   (/shared/OMNA/OMACPM20/
DefaultFolderLocation "INBOX/CPM2/-=default=-")
S: 1 OK GETMETADATA complete
```

In some embodiments, a metadata fetch operation may be used to allow a requestor, such as a message storage client, to retrieve server or mailbox annotations. The metadata fetch operation may allow a requestor to retrieve the metadata associated with the server (i.e. server annotations) or a particular message object (e.g. a CPM Standalone Message, a CPM Standalone Media object, CPM Session Info object, etc.) or folder object (e.g. the "default" system folder, user folders, CPM Session History folder, etc.) in the active folder on the Message Storage Server. The requestor's request may include the mailbox name whose metadata is requested and an entry specifier. The mailbox name may be an empty string, i.e. " ", in order to retrieve server annotations.

The metadata fetch operation may allow a requestor to extend the list of entry values in a fetch operation by using the DEPTH command option. Network overhead and delays may be reduced by a requestor retrieving annotations in batches using the DEPTH command. In these cases, the DEPTH command should be used with the value "infinity" and the entry specifier should specify a higher level in the hierarchy, e.g. "/shared/OMNA", "/shared/OMNA/OMNACPM20", etc. Upon receiving a metadata fetch request, the message storage server may return the requested annotation(s) for the indicated mailbox. If successful, the message storage server may respond with an OK response, otherwise the message storage server may respond with an appropriate error message.

Several sample metadata entries are shown below:

| Entry name | Valid namespace(s) | Server annotation | Mailbox annotation | Purpose | Format |
|---|---|---|---|---|---|
| DefaultFolderLocation | /shared/OMNA/OMACPM20 | Y | N | Indicates the location of the "default" system folder | /INBOX/CPM2/-=default=- |
| SessionInfoObjectID | /shared/OMNA/OMACPM20 | N | Y | Indicates the location of the Session Info Object within the mailbox | 3000 |
| GroupStateObjectID | /shared/OMNA/OMACPM20 | N | Y | Indicates the location of the Group State Object within the mailbox | 4000 |

In certain embodiments, while handling a session invite, the CPM PF may create session history folder for use with the corresponding session. The session history folder name may be set to the session-id value of the associated session info object. The session info object for the session may be stored in the session history folder. The CPM PF may retrieve the UID of the stored session info object and set the session history folder's "/shared/OMNA/OMACPM20/SessionInfoObjectID" metadata entry to the UID of the session info object.

In certain embodiments, while handling a BYE request, the CPM PF may create and store a group state object. The CPM PF may retrieve the UID of the group state object and set the session history folder's "/shared/OMNA/OMACPM20/GroupStateObjectID" metadata entry to the UID of the group state object. The CPM PF may then retrieve the UID of the session info object from the session history folder's "/shared/OMNA/OMACPM20/SessionInfoObjectID" metadata entry and include in a SIP 200 "OK" response a message-UID header set to the UID of the session info object.

Figure 3:
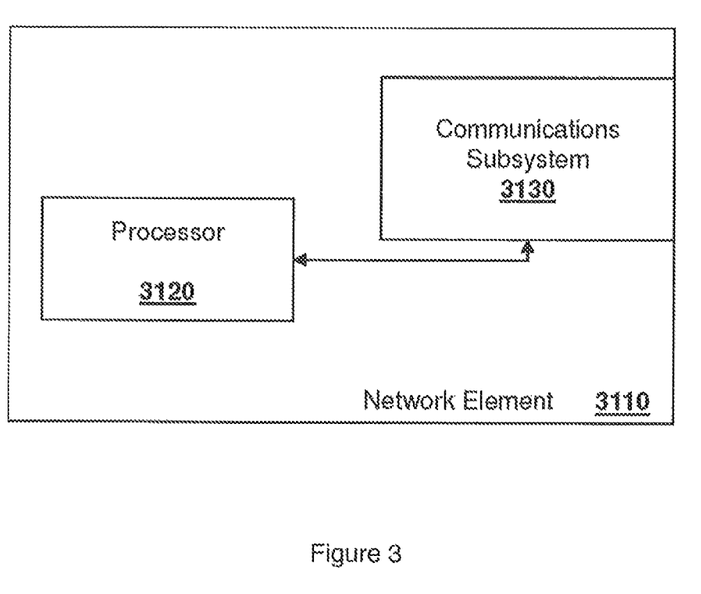
FIG. 3 is a diagram of a simplified network element.

In certain embodiments, upon a SIP session timer expiry, the CPM PF may create and store a group state object in the CPM Session History Folder. The CPM PF may retrieve the UID of the stored group state object, and then set the Session History Folder's "/shared/OMNA/OMACPM20/GroupStateObjectID" metadata entry to the UID of the group state object. The CPM PF may also retrieve the UID of the session history info object and set the session history folder's "/shared/OMNA/OMACPM20/SessionInfoObjectID" metadata entry with the UID of the session history info object Certain embodiments above may be implemented by a network element. A simplified network element is shown with regard to FIG. 3. In FIG. 3, network element 3110 includes a processor 3120 and a communications subsystem 3130, where the processor 3120 and communications subsystem 3130 cooperate to perform the methods described above.

Figure 4:
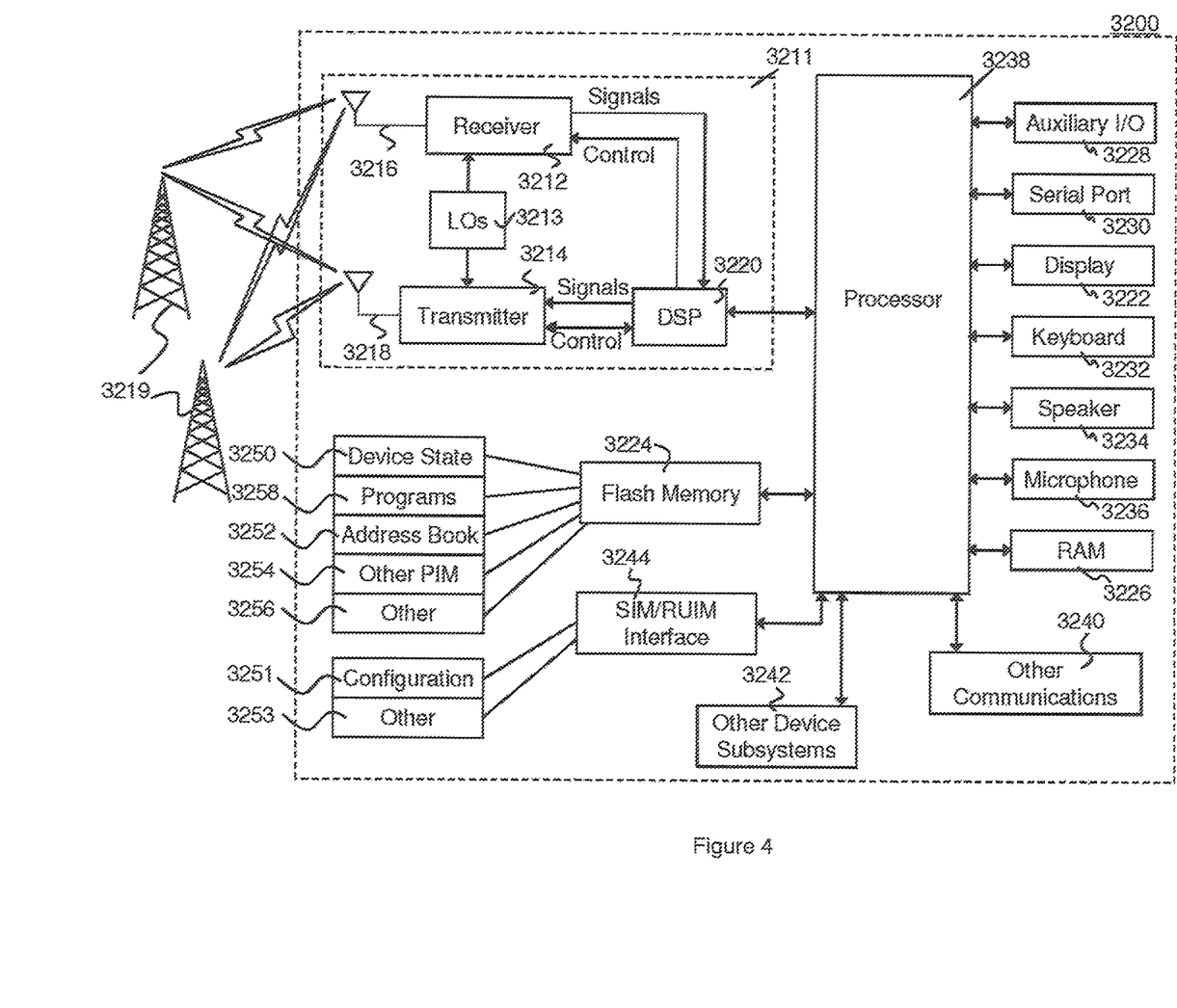
FIG. 4 is a diagram of a UE.

Further, certain embodiments may be implemented by a UE. One exemplary device is described below with regard to FIG. 4. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in FIG. 4, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 can include a USB port or other port known to those in the art.

Some of the subsystems shown in FIG. 29 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 29 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 5:
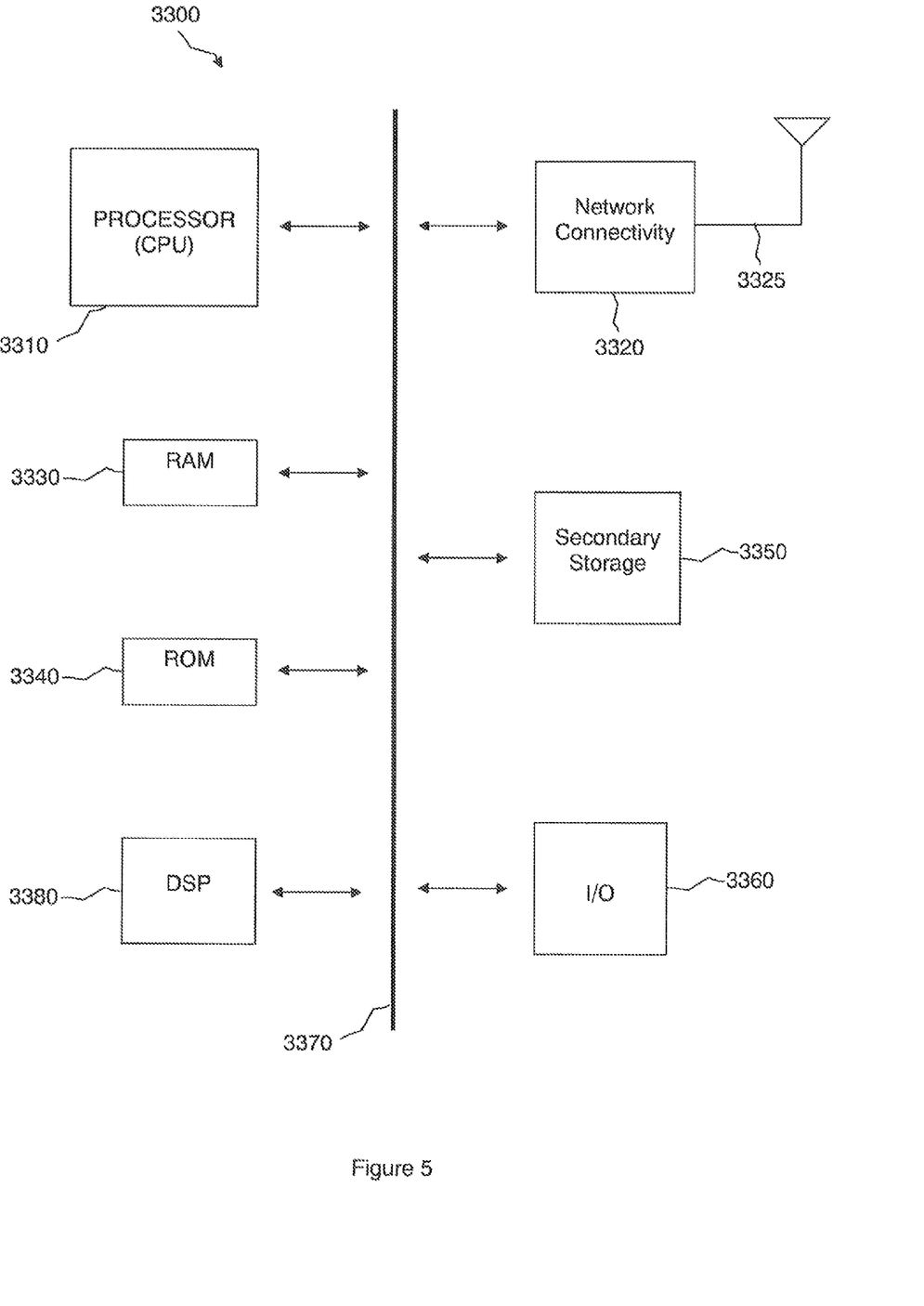
FIG. 5 is a diagram of a processing component.

The UE and other components described above might include a processing component that is capable of executing instructions related to the actions described above. As used herein, the term instructions may include reserved words which cause one or more processors to take certain computational, memory-related or control actions or to send computational, memory-related or control signals. As used herein, the term program may include a collection of computer instructions. FIG. 5 illustrates an example of a system 3300 that includes a processing component 3310 suitable for implementing one or more embodiments disclosed herein. The processing component 3310 may be substantially similar to the processor 3120 of FIG. 3 and/or the processor 3238 of FIG. 4.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380.

Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips and may be a hardware device capable of executing computer instructions.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The following are incorporated herein by reference for all purposes: OMA-AD-CPM-V2_0-20120926-D, OMA-TS-CPM_System_Description-V2_0-20121122-D, OMA-TS-CPM_Message_Storage-V2_0-20121122-D, IETF RFC5464, IETF RFC5257, IETF RFC3501, IETF RFC5322, IETF RFC3986, IETF RFC2396, and IETF RFC5494.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of providing access to an Open Mobile Alliance (OMA) object, the method performed by an email network device, wherein the OMA object is in a mailbox, the method comprising:
    storing a reference as an Internet Message Access Protocol (IMAP) metadata extension entry associated with the mailbox, wherein the mailbox contains the OMA object; and
    using the reference to identify the OMA object,
    wherein the storing step is responsive to at least one of:
        expiry of a Session Initiation Protocol (SIP) Session Timer; or
        reception of a Session Initiation Protocol (SIP) BYE Request message.

2. The method of claim 1, wherein the reference is one of a Unique Identifier (UID) message attribute, a sequence number, or an IMAP Universal Resource Locator (URL).

3. The method of claim 1, wherein the OMA object is a session info object or a group state object.

4. The method of claim 1, further comprising:
    storing the reference in a namespace, wherein each entry in the namespace has a hierarchical name, and the hierarchical name of the reference comprises a token and the token comprises one or more of the group consisting of an enabler and an enabler revision number.

5. The method of claim 1, wherein the reference is registered within a registration namespace, wherein the registration namespace is dedicated to the use of a standards development organization.

6. The method of claim 5, wherein the standards development organization is the Open Mobile Alliance (OMA).

7. The method of claim 1, wherein the email network device is a Converged Internet Protocol (IP) Messaging (CPM) Participating Function (CPM PF).

8. The method of claim 1, further comprising issuing a set command, wherein the set command causes a reference to be stored as a metadata entry associated with the mailbox.

9. The method of claim 8, wherein the set command is a SETMETADATA command.

10. The method of claim 1, wherein the mailbox is a session history folder.

11. The method of claim 1, wherein the OMA object is a session info object.

12. The method of claim 1, wherein the OMA object is a group state object.

13. A method of using a folder by a Converged Internet Protocol (IP) Messaging (CPM) Participating Function (CPM PF), the method comprising:
   setting an Internet Message Access Protocol (IMAP) metadata extension entry in a folder; and
   using the IMAP metadata extension entry to identify an Open Mobile Alliance (OMA) object associated with the folder, wherein the IMAP metadata extension entry comprises a reference used to identify the OMA object,
   wherein the setting step is responsive to at least one of:
      expiry of a Session Initiation Protocol (SIP) Session timer; or
      reception of a message by the CPM PF, wherein the message is a Session Initiation Protocol (SIP) BYE Request.

14. The method of claim 13, wherein the reference is one of a Unique Identifier (UID) message attribute, a sequence number, or an IMAP Universal Resource Locator (URL).

15. The method of claim 13, wherein the reference is retrieved from a message storage server.

16. The method of claim 13, wherein the OMA object is a session info object.

17. The method of claim 13, wherein the folder is a session history folder.

18. The method of claim 13, wherein the OMA object is a group state object.

19. A device comprising:
   a processor, wherein the processor is configured to set an Internet Message Access Protocol (IMAP) metadata extension entry in a folder;
   the processor further configured to use the IMAP metadata extension entry to identify an Open Mobile Alliance (OMA) object associated with the folder, wherein the IMAP metadata extension entry comprises a reference used to identify the OMA object,
   wherein the IMAP metadata extension entry is set responsive to at least one of:
      expiry of a Session Initiation Protocol (SIP) Session Timer; or
      reception of a Session Initiation Protocol (SIP) BYE Request message.

20. The device of claim 19, wherein the reference is one of a Unique Identifier (UID) message attribute, a sequence number, or an IMAP universal Resource Locator (URL).

21. The device of claim 20, wherein the reference is stored in a namespace, wherein each entry in the namespace has a hierarchical name, and the hierarchical name of the reference comprises a token and the token comprises the name of an enabler.

22. The device of claim 19, wherein the reference is registered within a registration namespace, wherein the registration namespace is dedicated to the use of a standards development organization.

23. The device of claim 22, wherein the standards development organization is the Open Mobile Alliance (OMA).

24. A computer program product, comprising computer readable memory, the computer readable memory containing instructions, the computer readable instructions adapted to be executed by a processor to implement a method for providing a reference to an Open Mobile Alliance (OMA) object, the method comprising:
   setting an Internet Message Access Protocol (IMAP) metadata extension entry in a folder of a mailbox, wherein the IMAP metadata extension entry comprises a reference to an OMA object, and wherein the mailbox contains the OMA object; and
   using the reference to identify the OMA object,
   wherein the setting step is set responsive to at least one of:
      expiry of a Session Initiation Protocol (SIP) Session Timer; or
      reception of a Session Initiation Protocol (SIP) BYE Request message.

25. The computer program product of claim 24, wherein the reference is one of a Unique Identifier (UID) message attribute, a sequence number, or an IMAP Universal Resource Location (URL).

* * * * *